United States Patent
Lin et al.

(10) Patent No.: US 9,734,383 B2
(45) Date of Patent: Aug. 15, 2017

(54) METHOD AND ELECTRONIC DEVICE FOR FINGERPRINT RECOGNITION

(71) Applicant: Egis Technology Inc., Taipei (TW)

(72) Inventors: Todd Lin, Taipei (TW); Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 50 days.

(21) Appl. No.: 14/879,016

(22) Filed: Oct. 8, 2015

(65) Prior Publication Data

US 2016/0328599 A1    Nov. 10, 2016

(30) Foreign Application Priority Data

May 7, 2015   (CN) .......................... 2015 1 0228974

(51) Int. Cl.
*G06K 9/00* (2006.01)
*G05B 19/00* (2006.01)

(52) U.S. Cl.
CPC ..... *G06K 9/00073* (2013.01); *G06K 9/00013* (2013.01); *G06K 9/00087* (2013.01)

(58) Field of Classification Search
CPC ........... G06K 9/00067; G06K 9/00087; G06K 9/00006; G06K 9/0008; G06K 9/00073; G06K 9/00013; G07C 9/00158
USPC ....... 382/124, 125, 100, 115, 127, 205, 181, 382/190, 195, 116, 168, 169, 276, 293, 382/298, 299, 296, 171, 209, 254, 256, 382/258, 259; 340/5.2, 5.1, 5.8, 5.81, 340/5.82, 5.83, 5.52, 5.53; 713/186, 185; 726/2, 3, 5
See application file for complete search history.

(56) References Cited

U.S. PATENT DOCUMENTS

| | | | | |
|---|---|---|---|---|
| 4,896,363 A * | 1/1990 | Taylor | ................ | G07C 9/00158 382/125 |
| 5,787,187 A | 7/1998 | Bouchard et al. | | |
| 6,623,935 B2 | 9/2003 | Overney et al. | | |
| 7,133,542 B2 * | 11/2006 | Takeuchi | ........... | G06K 9/00006 340/5.82 |
| 7,315,633 B2 | 1/2008 | Funahashi | | |
| 7,450,741 B2 | 11/2008 | Daniel et al. | | |
| 8,135,180 B2 * | 3/2012 | Baltatu | ................... | G06F 21/32 382/115 |
| 8,624,605 B2 | 1/2014 | Hemmady et al. | | |
| 9,400,912 B2 * | 7/2016 | Wu | .................... | G06K 9/00033 |
| 9,418,276 B2 * | 8/2016 | Yamada | ............. | G06K 9/00073 |

FOREIGN PATENT DOCUMENTS

| | | |
|---|---|---|
| CN | 102321739 | 1/2012 |
| CN | 103605963 A | 2/2014 |
| TW | 556117 | 10/2003 |
| TW | 200813859 | 3/2008 |
| TW | 201012439 | 10/2014 |

\* cited by examiner

*Primary Examiner* — Sheela C Chawan

(57) ABSTRACT

A fingerprint recognition method and electronic device are provided. The fingerprint recognition method includes the steps of obtaining first input data; generating a first waveform diagram corresponding to a first minutia of the first input data; obtaining second input data; generating a second waveform diagram corresponding to a second minutia of the second input data; and comparing the first waveform diagram with the second waveform diagram.

12 Claims, 6 Drawing Sheets

METHOD AND ELECTRONIC DEVICE FOR FINGERPRINT RECOGNITION

CROSS REFERENCE TO RELATED APPLICATIONS

This Application claims priority of CN Patent Application No. 201510228974.X filed on May 7, 2015, the entirety of which is incorporated by reference herein.

BACKGROUND OF THE INVENTION

Field of the Invention

The invention generally relates to fingerprint recognition technology, and more particularly, to fingerprint recognition technology for verifying a fingerprint according to a waveform diagram generated according to the circumference corresponding to the minutia of the fingerprint data.

Description of the Related Art

In recent years, biometric recognition technology has developed greatly. Since security codes and access cards may easily be stolen or lost, more attention has been paid to fingerprint-recognition technology. Fingerprints are unique and never-changing, and each person has multiple fingers for identity recognition. In addition, fingerprints can be obtained easily using fingerprint sensors. Therefore, fingerprint recognition can provide increased security and convenience, and financial security and confidential data can be better protected.

With conventional fingerprint recognition technology, the fingerprint recognition device may perform fingerprint recognition by comparing the minutiae of the fingerprint data, patterns of the fingerprint data or spectrums of the fingerprint data. For the fingerprint recognition technology performed by comparing the minutiae of the fingerprint data, when the sensing area of the fingerprint sensor is too small, the captured fingerprint data comprises few minutiae. Therefore, if the fingerprint recognition device adopts minutiae for fingerprint recognition, the reliability of the fingerprint recognition will decrease.

For the fingerprint recognition technology performed by comparing the patterns of fingerprint data, the fingerprint recognition device directly adopts the patterns captured by the fingerprint sensor for fingerprint recognition. However, for this fingerprint recognition technology, the patterns of the fingerprint data will occupy a lot of storage space and the fingerprint recognition device needs to consume more resources to handle the greater quantity of calculation required. In addition, for this fingerprint recognition technology, when a shift or rotation exists among fingerprint data, the fingerprint recognition will be prone to failure.

For the fingerprint recognition technology performed by comparing the spectrums of the fingerprint data, the fingerprint recognition device may transform the captured fingerprint data to the spectrums, and then compare the spectrums. However, for this fingerprint recognition technology, the fingerprint recognition device also needs to consume more resources for calculation and the fingerprint recognition may also be negatively affected when a shift or rotation exists among fingerprint data.

BRIEF SUMMARY OF THE INVENTION

A fingerprint recognition method and electronic device are provided to verify a fingerprint according to a waveform diagram generated according to the circumference corresponding to the minutia of the fingerprint data.

An embodiment of the invention provides a fingerprint recognition method. The fingerprint recognition method comprises the steps of obtaining first input data; generating a first waveform diagram corresponding to a first minutia of the first input data; obtaining second input data; generating a second waveform diagram corresponding to a second minutia of the second input data; and comparing the first waveform diagram with the second waveform diagram.

An embodiment of the invention provides an electronic device. The electronic device comprises a fingerprint sensor and a processing unit. The fingerprint sensor is configured to obtain first input data and second input data. The processing unit is configured to generate a first waveform diagram corresponding to a first minutia of the first input data and generate a second waveform diagram corresponding to a second minutia of the second input data. Then the processing unit is further configured to compare the first waveform diagram with the second waveform diagram.

Other aspects and features of the invention will become apparent to those with ordinary skill in the art upon review of the following descriptions of specific embodiments of methods and electronic devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
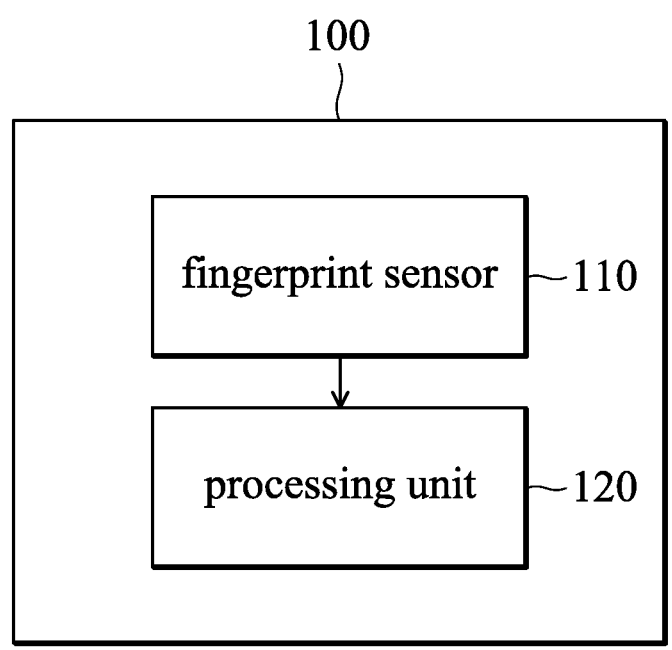
FIG. 1 is a block diagram of a fingerprint matching device according to an embodiment of the invention.

FIG. 1 is a block diagram of an electronic device 100 according to an embodiment of the invention. In an embodiment of the invention, the electronic device 100 is an electronic device with a fingerprint recognition function, e.g. a mobile phone, a smartphone, a tablet computer, a note book, and so on. As shown in FIG. 1, the electronic device 100 comprises a fingerprint sensor 110 and a processing unit 120. FIG. 1 presents a simplified block diagram in which only the elements relevant to the invention are shown. However, the invention should not be limited to what is shown in FIG. 1.

In an embodiment of the invention, when user registers his or her fingerprint for fingerprint recognition, the user will put his or her finger on the fingerprint sensor 110 of the electronic device 100. Then, the fingerprint sensor 110 will scan the user's fingerprint to obtain first input data, wherein the first input data comprises a plurality of minutiae.

After obtaining the first input data, the processing unit 120 will take each of the minutiae as the center of a circle and take a first length as a radius to draw circles around the minutiae for generating the circumferences respectively corresponding to each of the minutiae of the first input data. After generating the circumferences corresponding to the minutiae of the first input data, the processing unit 120 will transform the circumferences corresponding to the minutiae of the first input data to waveform diagrams.

Figures 2A, 2B:
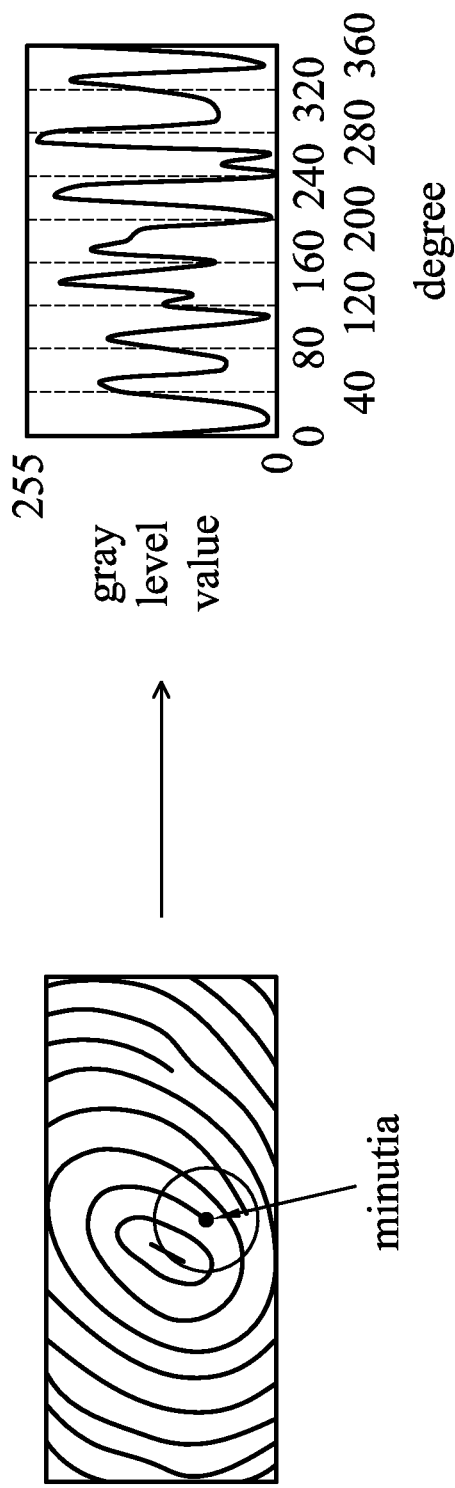
FIG. 2A is a schematic diagram illustrating a circumference according to an embodiment of the invention.
FIG. 2B is a schematic diagram illustrating a waveform diagram according to an embodiment of the invention.

FIG. 2A is a schematic diagram illustrating a circumference according to an embodiment of the invention. In an embodiment of the invention, each of the circumferences corresponding to each of the minutiae of the first input data comprises a plurality of sampling points, wherein the processing unit 120 obtains the sampling points according to a sampling angle $\Delta\theta$. For example, if the sampling angle $\Delta\theta$ is 10 degrees, the circumference will comprise 36 sampling points. FIG. 2B is a schematic diagram illustrating a waveform diagram according to an embodiment of the invention. As shown in FIG. 2B, in an embodiment of the invention, the processing unit 120 transforms each of the circumferences corresponding to each of the minutiae of the first input data to a waveform diagram according to the gray level values corresponding to the sampling points comprised in each of the circumferences. Namely, the unit of the horizontal axis is degree and the unit of the vertical axis is gray level value. Note that the processing unit 120 may generate waveform diagrams corresponding to the minutiae of another input data (e.g. the second input data) in the same way as the embodiment.

In an embodiment of the invention, for fingerprint recognition, the user may put his or her finger on the fingerprint sensor 110 of the electronic device 100. Then the fingerprint sensor 110 will scan the user's fingerprint to obtain second input data, wherein the second input data comprises a plurality of minutiae. After obtaining the second input data, the processing unit 120 will take each of the minutiae as the center of a circle and take a first length as a radius to draw circles for generating the circumferences corresponding to each of the minutiae of the second input data. After generating the circumferences corresponding to each of the minutiae of the second input data, the processing unit 120 will transform the circumferences corresponding to the minutiae of the second input data to waveform diagrams.

In an embodiment of the invention, for fingerprint recognition, the processing unit 120 may compare the waveform diagrams corresponding to the first input data with the waveform diagrams corresponding to the second input data. In an embodiment of the invention, after comparing the waveform diagrams corresponding to the first input data with the waveform diagrams corresponding to the second input data, the processing unit 120 will determine whether one or more waveform diagrams of the first input data match one or more waveform diagrams of the second input data. In an embodiment of the invention, if there are one or more matching waveform diagrams between the first input data and the second input data, the processing unit 120 will determine that the user's fingerprint is verified.

Figure 3:
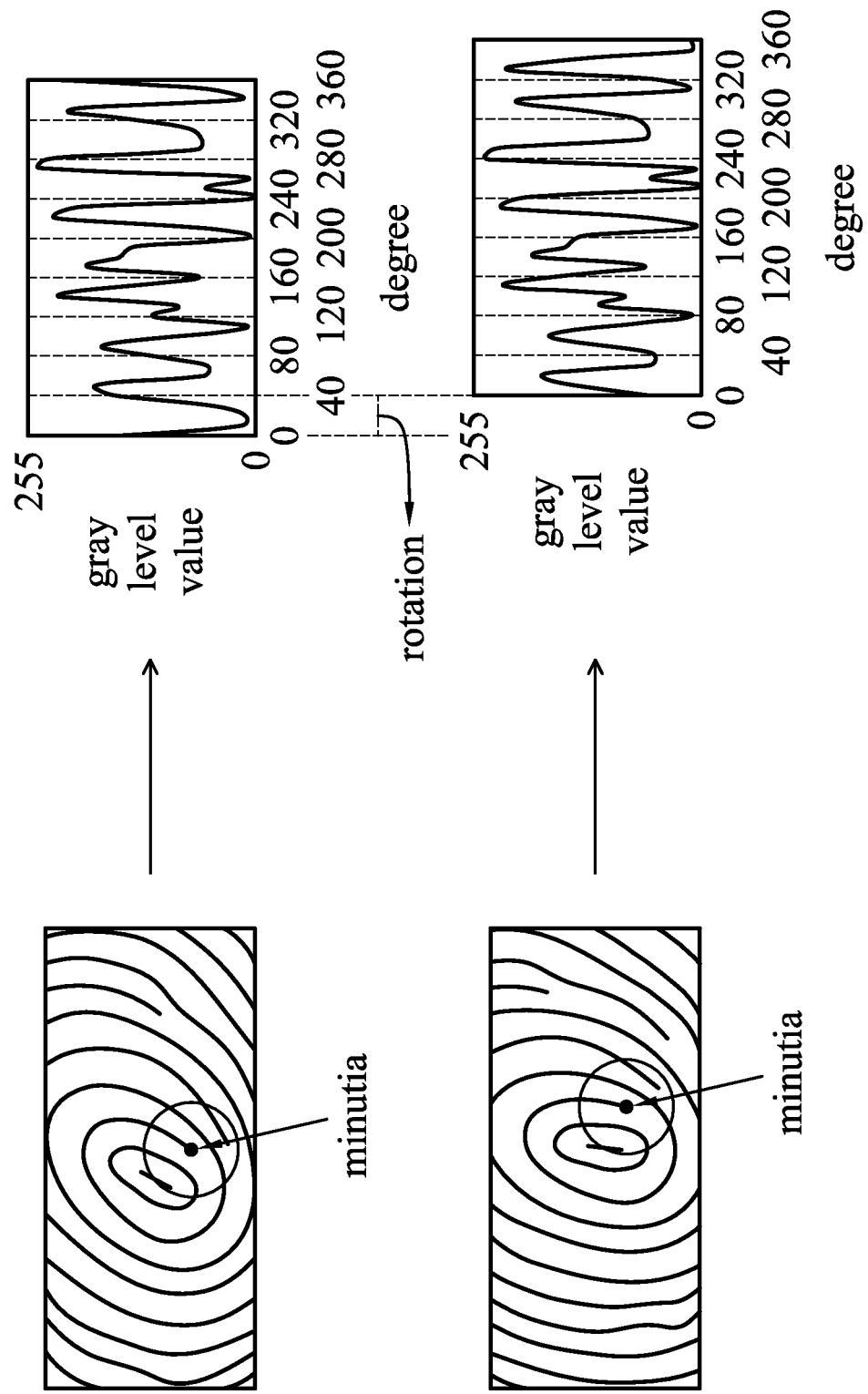
FIG. 3 is a schematic diagram illustrating a rotation angle between waveform diagrams according to an embodiment of the invention.

FIG. 3 is a schematic diagram illustrating a rotation angle between waveform diagrams according to an embodiment of the invention. As shown in FIG. 3, when a user puts his or her finger on the fingerprint sensor 110, the user may place difference areas of his or her finger on the fingerprint sensor 110 at different times and/or put his or her finger on the fingerprint sensor 110 along different angles at different times. Therefore, a rotation angle may exist among the first input data and the second input data due to the different areas and/or angles.

In another embodiment of the invention, if there are more than one matching waveform diagrams between the first input data and the second input data, the processing unit 120 will further determine whether any of the rotation angles corresponding to different pairs of the matching waveform diagrams is approximate to or the same as another. For example, when a first waveform diagram corresponding to the first minutia of the first input data matches a second waveform diagram corresponding to the second minutia of the second input data, and a third waveform diagram corresponding to the third minutia of the first input data matches a fourth waveform diagram corresponding to the fourth minutia of the second input data, the processing unit 120 may further determine whether the rotation angle between the first waveform diagram and the second waveform diagram are approximated to or the same as the rotation angle between the third waveform diagram and the fourth waveform diagram. If the rotation angles are approximate or the same, the processing unit 120 will determine that the user's fingerprint is verified. If the rotation angles are not approximate or the same, the processing unit 120 will determine that the user's fingerprint fails the verification.

Figure 4:
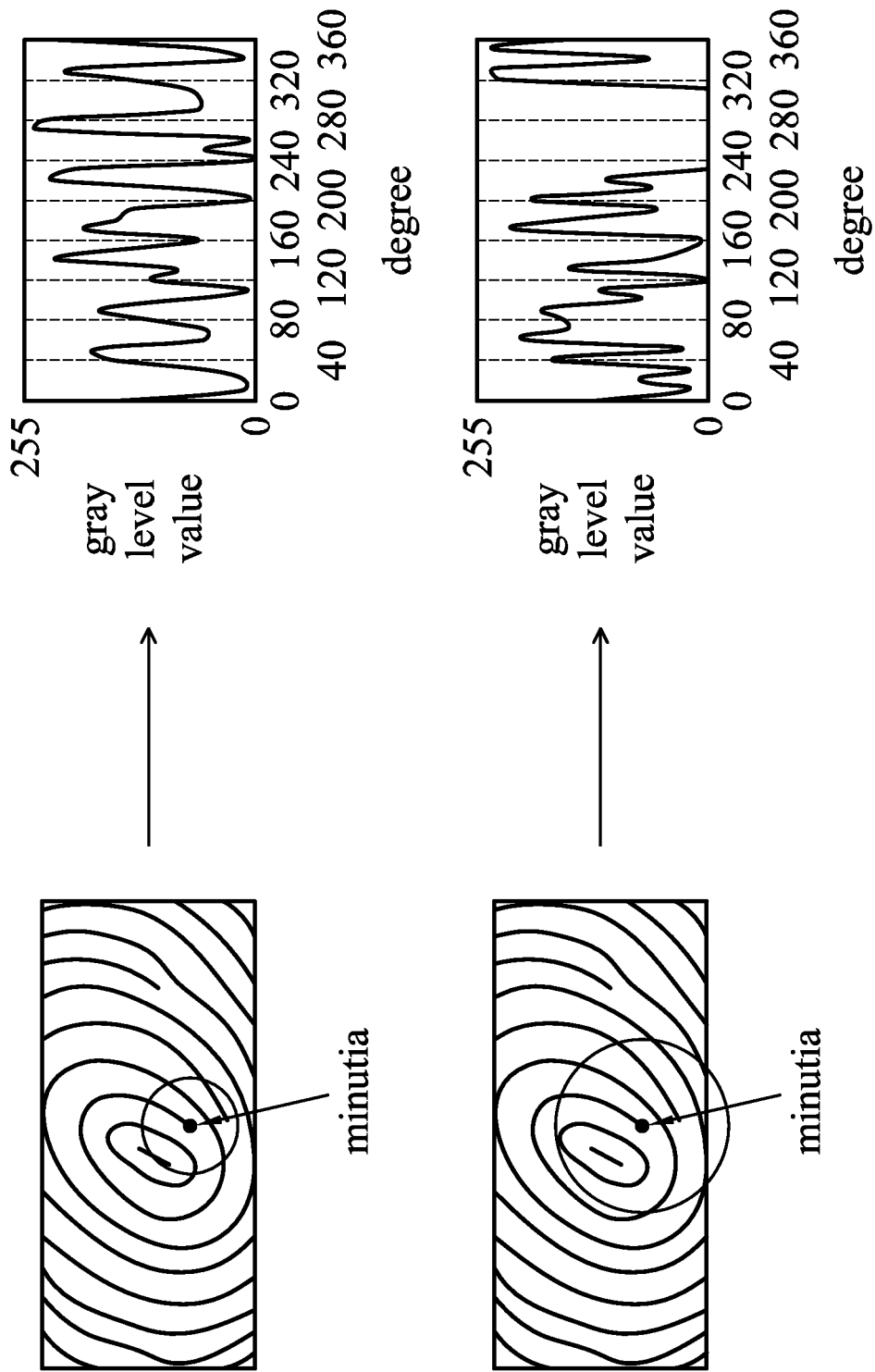
FIG. 4 is a schematic diagram illustrating waveform diagrams corresponding to different radiuses according to an embodiment of the invention.
Figure 5:
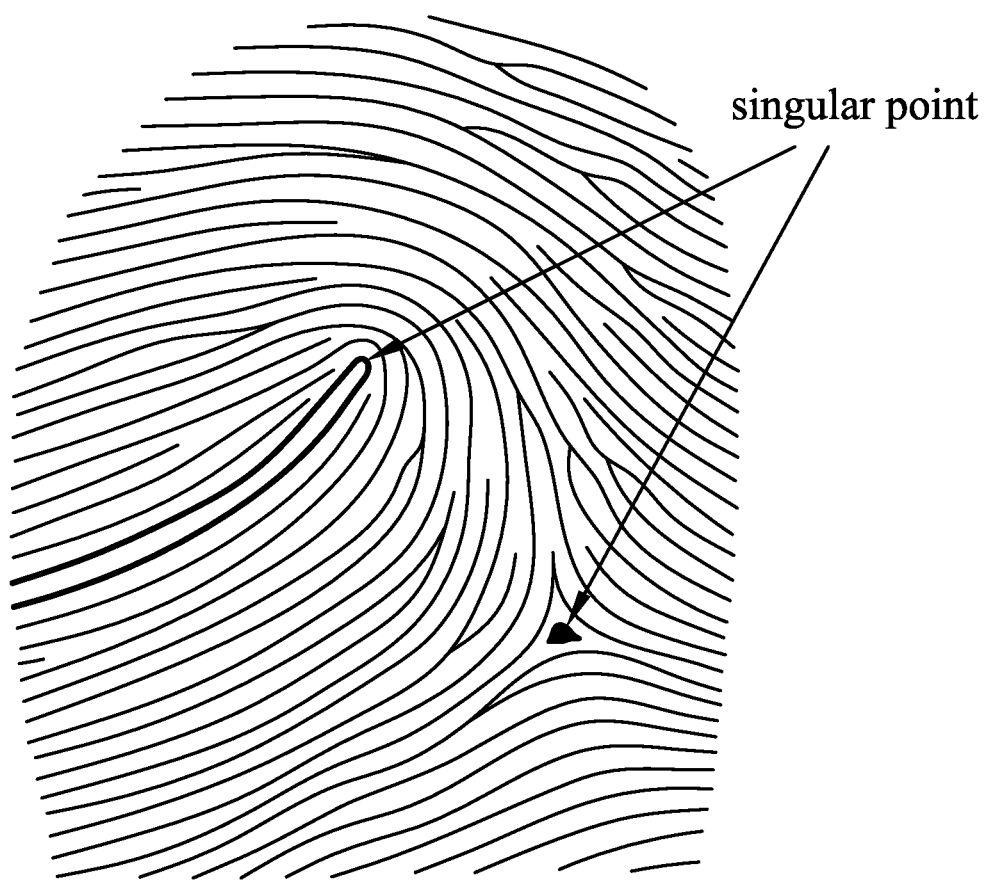
FIG. 5 is a schematic diagram illustrating singular points according to an embodiment of the invention.

FIG. 4 is a schematic diagram illustrating waveform diagrams corresponding to different radiuses according to an embodiment of the invention. As shown in FIG. 4, in another embodiment of the invention, the processing unit 120 generates the waveform diagrams corresponding to the first input data and the second input data corresponding to different radiuses. For example, the processing unit 120 will take a first length as a radius to generate a first circumference and a first waveform diagram corresponding to a first minutia of the first input data and a second circumference and a second waveform diagram corresponding to a second minutia of the second input data. Then, the processing unit 120 will take a second length as a radius to generate a third circumference and a third waveform diagram corresponding to the first minutia of the first input data and a fourth circumference and a fourth waveform diagram corresponding to the second minutia of the second input data. In an embodiment of the invention, if the first waveform diagram matches the second waveform diagram and the third waveform diagram matches the fourth waveform diagram, the processing unit 120 will determine that the user's fingerprint is verified. If the first waveform diagram does not match the second waveform diagram or the third waveform diagram does not match the fourth waveform diagram, the processing unit 120 will determine that the user's fingerprint fails the verification.

In an embodiment of the invention, the processing unit 120 may select at least two lengths as radiuses. When the processing unit 120 takes one of the lengths as radius and the waveform diagram corresponding to the first input data does not match the waveform diagram corresponding to the second input data, the processing unit 120 will not take another length as radius to generate the waveform diagrams corresponding to the first input data and the second input data. For example, if the processing unit 120 selects five different lengths as radiuses and when the processing unit 120 takes the second length as radius, the waveform diagram corresponding to the first input data does not match the waveform diagram corresponding to the second input data, the processing unit 120 will not take the third length, fourth length, and fifth length as radiuses to generate the waveform diagrams corresponding to the first input data and the second input data.

In another embodiment of the invention, the processing unit 120 may determine whether the circumference comprises any singular point. The singular point has higher recognition value. Therefore, if the circumference comprises a singular point, the portion of the circumference corresponding to the singular point will have a higher weighting value when the processing unit 120 transforms the circumference to the waveform diagram. In the embodiment of the invention, the singular point can be the center of the vortex of the fingerprint or a triangle point (as shown in FIG. 0.5).

Figure 6:
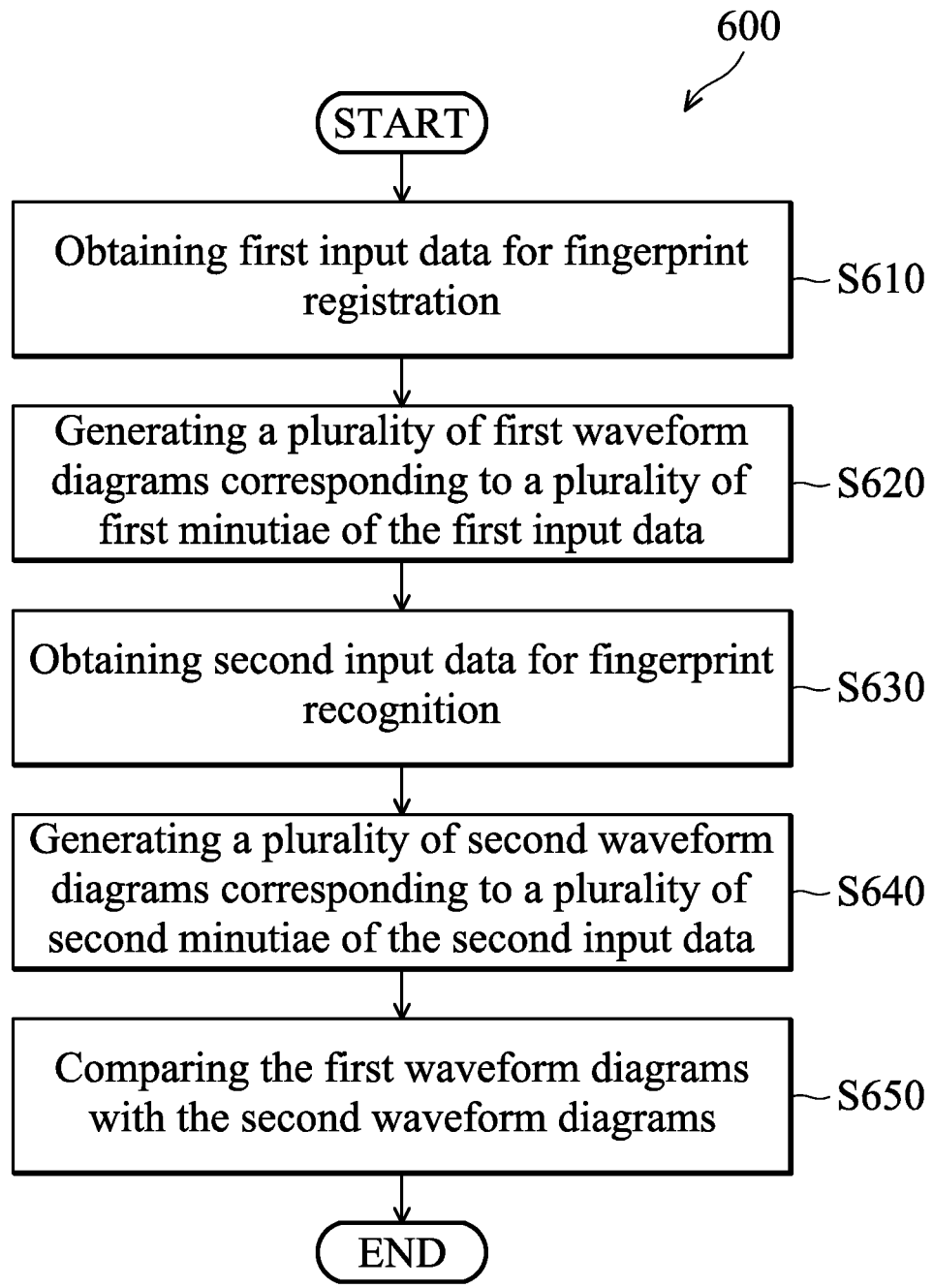
FIG. 6 is a flow chart illustrating a fingerprint recognition method according to an embodiment of the invention.

FIG. 6 is a flow chart 600 illustrating a fingerprint recognition method according to an embodiment of the invention. The fingerprint recognition method is applied to the electronic device 100. As shown in FIG. 6, in step S610, the electronic device 100 obtains first input data for fingerprint registration. In step S620, the electronic device 100 generates a plurality of first waveform diagrams corresponding to a plurality of first minutiae of the first input data. In step S630, for fingerprint recognition, the electronic device 100 obtains second input data. In step S640, the electronic device 100 generates a plurality of second waveform diagrams corresponding to a plurality of second minutiae of the second input data. In step S650, the electronic device 100 compares the first waveform diagrams with the second waveform diagrams.

In an embodiment of the invention, step S620 may further comprise that the processing unit 120 takes each of the first minutiae as the center of a circle and takes a first length as a radius to draw circles for generating the first circumferences each of which is corresponding to each of the first minutiae and transforming the first circumferences to the first waveform diagrams. Step S640 may further comprise that the processing unit 120 takes each of the second minutiae as the center of a circle and takes the first length as a radius to draw circles for generating the second circumferences each of which is corresponding to each of the second minutiae and transforming the second circumferences to the second waveform diagrams.

In an embodiment of the invention, the fingerprint recognition method may further comprise the step where the processing unit 120 compares the rotation angles of different pairs of matching waveform diagrams. In an embodiment of the invention, the fingerprint recognition method may further comprise the step where the processing unit 120 takes a second length as the radius to generate the waveform diagrams corresponding to the first input data and second input data. If the waveform diagram corresponding to the first input data matches the waveform diagram corresponding to the second input data when the radius is the first length and the waveform diagram corresponding to the first input data matches the waveform diagram corresponding to the second input data when the radius is the second length, the processing unit 120 will determine that the user's fingerprint is verified. If the waveform diagram corresponding to the first input data does not match the waveform diagram corresponding to the second input data when the radius is the first length or the waveform diagram corresponding to the first input data does not match the waveform diagram corresponding to the second input data when the radius is the second length, the processing unit 120 will determine that the user's fingerprint fails the verification.

In an embodiment of the invention, the fingerprint recognition method may further comprise the step where the processing unit 120 determines whether the circumference comprises a singular point. If the circumference comprises the singular point, the portion of the circumference corresponding to the singular point will have higher weighting value when the processing unit 120 transforms the circumference to the waveform diagram.

According to the fingerprint recognition method of the invention, the processing unit 120 can perform fingerprint recognition by comparing the waveform diagrams which are generated from the circumferences corresponding to the minutiae of the fingerprint data. Compared with the conventional fingerprint recognition method which is performed by comparing the spectrums corresponding to the fingerprint data, in the present invention, the processing unit 120 does not need to generate the spectrums corresponding to the fingerprint data for fingerprint recognition. Therefore, the computation performed by the processing unit 120 will decrease.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint recognition method, comprising:
obtaining, by a fingerprint sensor, first input data;
generating, by a processor, a first waveform diagram corresponding to a first minutia of the first input data by taking a first minutia as a center of a circle, taking a first length as a radius to generate a first circumference, and transforming the first circumference to the first waveform diagram;
obtaining, by the fingerprint sensor, second input data;
generating, by the processor, a second waveform diagram corresponding to a second minutia of the second input data by taking a second minutia as a center of a circle, taking the first length as a radius to generate a second circumference, and transforming the second circumference to the second waveform diagram; and
comparing, by the processor, the first waveform diagram with the second waveform diagram.

2. The fingerprint recognition method of claim 1, further comprising:
taking a third minutia of the first input data as a center of a circle and taking the first length as a radius to generate a third circumference;
transforming the third circumference to a third waveform diagram;
taking a fourth minutia of the second input data as a center of a circle and taking the first length as a radius to generate a fourth circumference;
transforming the fourth circumference to a fourth waveform diagram;
comparing the third waveform diagram with the fourth waveform diagram; and
comparing a first rotation angle between the first waveform diagram and the second waveform diagram with a second rotation angle between the third waveform diagram and the fourth waveform diagram.

3. The fingerprint recognition method of claim 1, further comprising:
taking the first minutia as a center of a circle and taking a second length as a radius to generate a fifth circumference;
transforming the fifth circumference to the fifth waveform diagram;
taking the second minutia as a center of a circle and taking the second length as a radius to generate a sixth circumference;
transforming the sixth circumference to the sixth waveform diagram;
comparing the fifth waveform diagram with the sixth waveform diagram; and
determining a fingerprint corresponding to the second input data is verified when the first waveform diagram matches the second waveform diagram, and the fifth waveform diagram matches the sixth waveform diagram.

4. The fingerprint recognition method of claim 1, further comprising:
determining whether the first circumference comprises a singular point; and
wherein if the first circumference comprises the singular point, when the first circumference is transformed to the first waveform diagram, the portion of the first circumference corresponding to the singular point will have higher weighting value.

5. The fingerprint recognition method of claim 1, wherein the first circumference comprising a plurality of sampling points corresponding to a sampling angle, wherein a horizontal axis of the first waveform diagram corresponds to a plurality of degrees of the sampling points and a vertical axis of the first waveform diagram corresponds to a plurality of gray level values of the sampling points.

6. The fingerprint recognition method of claim 1, further comprising:
determining a fingerprint corresponding to the second input data is verified when the first waveform diagram matches the second waveform diagram.

7. An electronic device, comprising:
a fingerprint sensor, configured to obtain first input data and second input data; and
a processor, connected to the fingerprint sensor configured to generate a first waveform diagram corresponding to a first minutia of the first input data by taking the first minutia of the first input data as a center of a circle, taking a first length as a radius to generate a first circumference, and transforming the first circumference to the first waveform diagram, generate a second waveform diagram corresponding to a second minutia of the second input data by taking the second minutia of the second input data as a center of a circle, taking the first length as a radius to generate a second circumference, and transforming the second circumference to the second waveform diagram, and compare the first waveform diagram with the second waveform diagram.

8. The electronic device of claim 7, wherein the processor is further configured to take a third minutia of the first input data as a center of a circle and take the first length as a radius to generate a third circumference, transform the third circumference to a third waveform diagram; and take a fourth minutia of the second input data as a center of a circle and take the first length as a radius to generate a fourth circumference, transform the fourth circumference to a fourth waveform diagram, and compare the third waveform diagram with the fourth waveform diagram, wherein the processor is further configured to compare a first rotation angle between the first waveform diagram and the second waveform diagram with a second rotation angle between the third waveform diagram and the fourth waveform diagram.

9. The electronic device of claim 7, wherein the processor is further configured to take the first minutia as a center of a circle and take a second length as a radius to generate a fifth circumference, transform the fifth circumference to the fifth waveform diagram; and take the second minutia as a center of a circle and take the second length as a radius to generate a sixth circumference, transform the sixth circumference to the sixth waveform diagram, and compare the fifth waveform diagram with the sixth waveform diagram, wherein when the first waveform diagram matches the second waveform diagram and the fifth waveform diagram matches the sixth waveform diagram, the processor determines a fingerprint corresponding to the second input data is verified.

10. The electronic device of claim 7, wherein the processor is further configured to determine whether the first circumference comprises a singular point, wherein if the first circumference comprises the singular point, when the first circumference is transformed to the first waveform diagram, the portion of the first circumference corresponding to the singular point will have higher weighting value.

11. The electronic device of claim 7, wherein the first circumference comprising a plurality of sampling points corresponding to a sampling angle, and a horizontal axis of the first waveform diagram corresponds to a plurality of degrees of the sampling points and a vertical axis of the first waveform diagram corresponds to a plurality of gray level values of the sampling points.

12. The electronic device of claim 7, where the processor is further configured to determining a fingerprint corresponding to the second input data is verified when the first waveform diagram matches the second waveform diagram.

\* \* \* \* \*